United States Patent [19]

Fooyontphanich et al.

[11] 4,205,429
[45] Jun. 3, 1980

[54] METHODS AND APPARATUS FOR INSERTING COILS INTO DYNAMOELECTRIC MACHINE STATOR ASSEMBLIES

[75] Inventors: John Fooyontphanich; Chye N. Goh, both of Singapore, Singapore

[73] Assignee: General Electric Company, Fort Wayne, Ind.

[21] Appl. No.: 14,538

[22] Filed: Feb. 23, 1979

[51] Int. Cl.² ............................................. H02K 15/06
[52] U.S. Cl. ................................. 29/596; 29/564.6; 29/736
[58] Field of Search ................ 29/596, 598, 606, 732, 29/734, 736, 564.6, 564.1; 140/92.1, 1

[56] References Cited

U.S. PATENT DOCUMENTS

| | | | |
|---|---|---|---|
| 2,432,267 | 12/1947 | Adamson | 29/596 |
| 2,836,204 | 5/1958 | Mason | 140/92.1 |
| 2,934,099 | 4/1960 | Mason | 140/92.1 |
| 3,324,536 | 6/1967 | Hill | 29/736 |
| 3,389,865 | 6/1968 | Stuckey | 242/1.1 |
| 3,447,225 | 6/1969 | Eminger | 29/736 |
| 3,484,923 | 12/1969 | Peters | 29/732 |
| 3,507,029 | 4/1970 | Stuckey et al. | 29/736 |
| 3,528,170 | 9/1970 | Duff et al. | 29/596 |
| 3,831,268 | 8/1974 | Boyd et al. | 29/598 |

*Primary Examiner*—Carl E. Hall
*Attorney, Agent, or Firm*—Ralph E. Krisher, Jr.

[57] ABSTRACT

Methods and apparatus are disclosed for accommodating at least one winding comprising at least one coil and a stator assembly including a magnetic core having axially extending insulated slots. One method involves confining a portion of leading end turns of the at least one coil and axially inserting side turns of the at least one coil into respective slots of the magnetic core by moving the confined portion of the leading end turns axially through a bore of the magnetic core and by moving transitional segments of the leading end turns axially along their respective slot entrances communicating with the bore. The method further includes guiding the side turns, which hang freely and trail the confined portion of the leading end turns, into their respective slots by displacing the side turns toward the bore prior to their entry into their respective slots. Guiding of the side turns reduces interengagement pressures between an insulation system of the stator assembly and the magnetic core at respective slot entrances communicating with a face of the core. An apparatus is provided for performing the above methods.

28 Claims, 6 Drawing Figures

METHODS AND APPARATUS FOR INSERTING COILS INTO DYNAMOELECTRIC MACHINE STATOR ASSEMBLIES

BACKGROUND OF THE INVENTION

The present invention relates generally to dynamoelectric machines and more particularly to improved methods and apparatus for inserting windings into dynamoelectric machine stator assemblies.

Currently employed schemes for positioning windings in magnetic cores of stator assemblies include the hand-placement of coils into stator cores; machine winding of coils directly in the cores; and various schemes for axially inserting coils into the cores in varying degrees of automation.

Exemplary automated approaches for the axial insertion of coils into magnetic cores include U.S. Pat. No. 2,432,267 (Adamson), 2,934,099 (Mason), 3,324,536 (Hill), 2,836,204 (Mason), and 3,528,170 (Duff et al); and the entire disclosures of these patents are incorporated herein by reference. It is the automated insertion of prewound coils as typified by these patents rather than manual insertion or inslot winding techniques with which the present invention is primarily concerned.

Coil insertion techniques are known in a variety of forms. For example, a single pole group (the set of coils forming a single pole for a dynamoelectric machine) may be wound and placed in stator core slots and thereafter the windings for another pole created and positioned in the slots of the stator core. In other situations, the entire multiple pole winding may be inserted into a stator core in a single pass and sometimes both the main or running windings as well as the auxiliary or start winding are placed in the stator core by a single coil insertion operation. Common to all of these coil injection techniques is the feature that leading end turn coil portions are moved through the stator core bore with the side turn portions of those coils trailing freely behind and passing axially into coil accommodating slots of the core.

In known prior art techniques for inserting coils into slots of a stator core, an inserting device retains portions of end turns of the coils within tooling thereof and axially moves these portions through a bore of the stator core. By axially moving the retained portions through the bore, side turn portions and trailing end turn portions of the coils are also moved but they usually hang freely about the inserting tooling during their approach to the core. With the side turns of the coils trailing in a freely hanging manner, the plurality of turns of each coil often occupy a substantially greater area than the area of a slot into which they are to be inserted. Furthermore, freely hanging side turns of the coils are almost inevitably not in alignment with the axial extending slots into which they are to be moved. Thus, the forced accommodation and alignment of the side turns with their respective slots causes an enormous pressure to be exerted on both the insulating material utilized to separate the winding turns of the coils from the magnetic core and on the magnet wire insulation (i.e., "enamel") itself. The insulating material for the electrical separation of the winding turns and the magnetic core may take the form of a coating such as, for example, an epoxy material disposed along at least the interior surface of the respective slots into which the turns are to be inserted. In other forms, the insulating material may take the form of a so-called slot liner which may comprise a sheet of insulating material such as, for example, paper or polyethylene terephalate which is available under the tradename "MYLAR" of E. I. DuPont de Nemours & Company. The slot liner is configured to conform to interior surfaces of the slots and may be provided with cuffs or tabs extending axially beyond the core faces to engage the faces and thereby prevent movement of the slot liner within the slot and also increase the separation between the magnet wire and slot edges or "corners".

The forced accommodation and alignment of the plurality of winding turns during their movement into their respective slots of the magnetic core and the resulting pressures or forces created thereby, may cause damage to the insulating material which is electrically separating the turns from the magnetic core as well as the wire insulation. The likelihood of damage to the insulating material is particularly acute along edges of the slots at slot entrances interfacing with a face of the core and into which side turns of the coils are initially moved into the slots. This insulation damage may take the form of insulation fatigue, tears, or other types of failures wherein the insulating material is sufficiently damaged so as to reduce or destroy the electrical separation between the winding turns and the magnetic core. Further, in certain types of machines, the insertion of particular coils may cause an increased likelihood of damage to insulating material than the insertion of the other coils. For example, in inserting the windings for a distributively wound two pole machine, the outer coils for each pole group may typically have a greater number of turns which must be forced or squeezed into a configuration so as to allow disposing of the side turns thereof into their respective slots of the core.

Accordingly, a general object of the present invention is to provide new and improved methods and apparatus for inserting coils into a dynamoelectric machine stator assembly which eliminate or minimize deficiencies and problems encountered heretofore as discussed hereinabove.

A more specific object of the present invention is to provide new and improved methods and apparatus for axially inserting coils into a dynamoelectric machine stator assembly which reduce the likelihood of damage to the insulation system of the stator assembly during such coil insertion processes.

Another object of the present invention is to provide new and improved methods and apparatus for axially inserting coils into slots of a stator assembly core in which freely hanging portions of the coils being inserted are guided into respective slots of the magnetic core.

Still another object of the present invention is to provide new and improved methods and apparatus for reducing the probability of damage to the insulation system of a stator assembly during insertion of coils therein in which freely hanging portions of the coil are displaced inwardly tworad a bore of the stator assembly prior to insertion into their respective slots.

A further object of the present invention is to provide new and improved methods and apparatus for minimizing damage to the insulation system of a stator assembly during a coil insertion process in which portions of the coils are circumferentially displaced relative to a face of the magnetic core.

SUMMARY OF THE INVENTION

One way of practicing the present invention, in one form thereof, involves confining a portion of leading end turn segments of at least one coil and axially inserting side turn segments of the at least one coil into respective slots of a magnetic core by moving the confined portion of the leading end turns axially through a bore of the magnetic core and by moving transitional segments of the leading end turns axially along their respective slot entrances communicating with the bore. This form further includes guiding the trailing and freely hanging side turns of the at least one coil into their respective slots by displacing the side turns toward the bore prior to their entry into their respective slots thereby reducing interengagement pressures between an insulation system and a magnetic core of the stator assembly. The displacing of the side turns may include radially converging such freely hanging side turns toward the bore for reducing the interengagement pressures between the insulation system and the magnetic core at respective slot entrances communicating with the face of the core.

In carrying out the present invention, in another form thereof which may also be used to carry out the above way of practicing the invention, an apparatus is provided for transferring at least one winding into a stator assembly including a guiding means for displacing side turns of at least one coil of the at least one winding inwardly relative to the bore prior to entrance of the side turns into their respective axially extending slots of a magnetic core of the stator assembly. Further, the apparatus includes a means for supporting a magnetic core of the stator assembly and a coil transfer device for confining a portion of leading end turns of the at least one coil and for axially inserting side turns of the at least one coil by moving the confined portions through the axially extending bore of the magnetic core whereby transitional segments of the leading end turns are axially moved through respective slots entrances communicating with the bore. Still further, the guiding means is disposed axially relative to the magnetic support for displacing the side turns of the at least one coil inwardly relative to the bore thereby reducing interengagement pressures between the insulation system and the magnetic core at respective slot entrances communicating with a face of the core. The guiding means may comprise a guide member for displacing the side turn of the at least one coil inwardly relative to the bore prior to their entrance into their respective slots. Further, the guiding means may include a deflecting means for circumferentially displacing portions of certain other coils prior to entrance of such portions into the axially extending slots of the magnetic core thereby further reducing the likelihood of damage to the insulation system of the stator assembly. The deflecting means may include a plurality of pins or studs for circumferentially deflecting side turn portions of at least some of the coils prior to movement of the side turns into their respective slots of the magnetic core.

DESCRIPTION OF THE PREFERRED EMBODIMENTS

Figure 1:
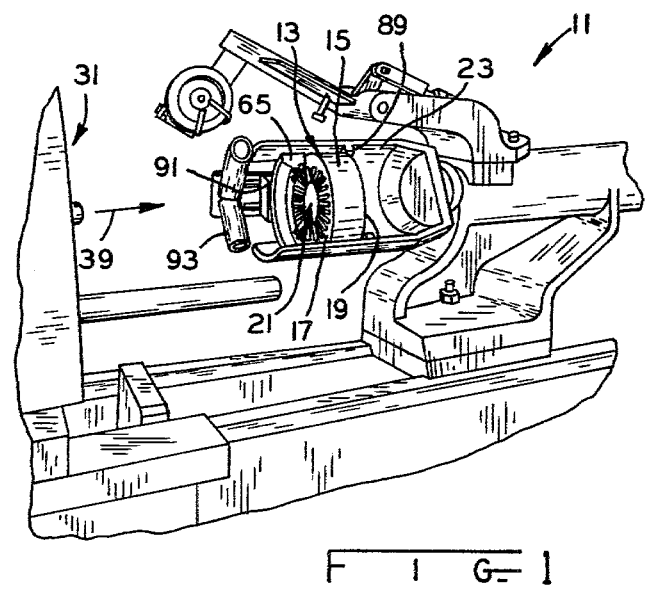
FIG. 1 is a perspective view of an apparatus utilized in practicing the present invention in one form thereof.
Figure 5:
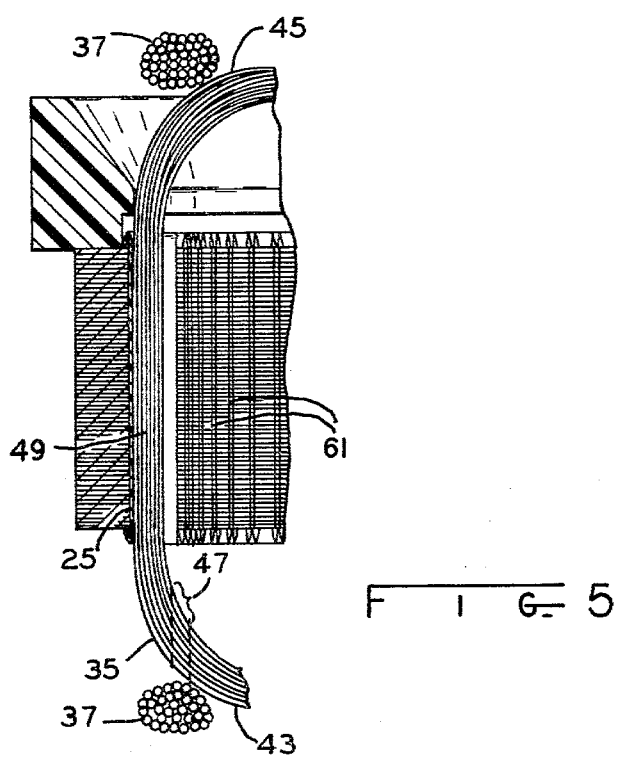
FIG. 5 is a partial cross-section view of the coil guiding device and the stator assembly of FIGS. 1-4 illustrating a coil with side turns thereof fully positioned within an axially extending slot of the stator assembly.

FIG. 1 illustrates an apparatus 11 for practicing the present invention in one form thereof. A dynamoelectric machine stator assembly 13 including a slotted magnetic core 15 having two spaced apart end faces 17 and 19 and an axially extending bore 21, is positioned and supported in a coil receiving position within the apparatus by a support means illustrated as cradle 23. As illustrated more clearly in FIG. 2, the stator assembly includes an insulation system illustrated as slot liners or insulators 25 (also see FIG. 5), disposed along interior walls of coil accommodating slots such as, for example, slots 27 and 29, which extend axially through the magnetic core. The insulation system provides electrical separation between the interior space of the slots and the magnetic core. The slot liners are formed from an insulating material such as, for example, an insulating paper or polyethylene terephalate which is available as a film under tradenames such as "MYLAR" of E. I. DuPont de Nemours & Company. Of course, the insulating system could comprise a coating of insulating material such as, for example, an epoxy disposed along interior walls of the slots and possibly about portions of the core faces, if desired.

The apparatus 11 illustrated in FIG. 1 is of a type substantially identical to the winding and inserting machine illustrated and described in the aforementioned Mason U.S. Pat. No. 2,934,099 which has previously been incorporated herein by reference and reference thereto may be made for complete details as to structure and operation of this type of device. In general, a predetermined number of coils, which are to be subsequently inserted into selected slots of a stator assembly, are wound on split stairstep type cylindrical forms located axially along the apparatus in the area generally denoted by the reference numeral 31. After coils have been wound, a portion of the coil forms are retracted with a remaining portion of the coil forms forming part of a coil transfer or inserting means such as transfer device or inserting mechanism 33 depicted in FIG. 2. The coil transfer device strips coils, such as coils 35 and 37 illustrated in FIG. 2, from winding forms of the apparatus 11 and moves the coils in an axial direction (illustrated by reference line 39 in FIG. 1) toward the stator assembly 13. Substantially simultaneously, the stator assembly is moved along the same reference line 39, but in an opposite direction, toward the transfer device by movement of the cradle 23.

Figure 2:
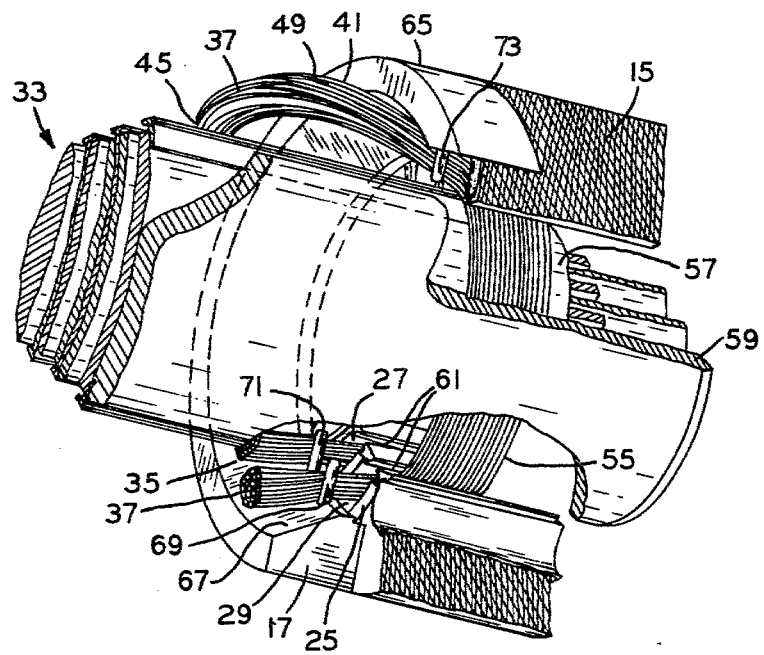
FIG. 2 is a perspective view, with parts cut away, of a coil inserting mechanism of a type utilized with the apparatus of FIG. 1, a coil guiding device and a stator assembly, illustrating the movement of side portions of coils into and along axially extending slots of the stator assembly.

As shown in FIG. 2, each of the coils 35 and 37 comprise a plurality of wire conductor turns such as turn 41. The turns of each coil have, as illustrated for the coil 35 in FIG. 5, leading end turn portions 43, trailing end turn portions 45 transitional segments 47 and side turn portions 49. The particular illustrated arrangement is for fabrication of a two pole motor with the coils 35 and 37 forming part of one pole of a main winding, that is, the outermost disposed coils of the pole. Although only the two coils have been illustrated for purposes of clarity, it is to be understood that each pole actually comprises five coils which are inserted substantially simultaneously by the transfer device 33 into respective slots of the magnetic core 15.

Figure 3:
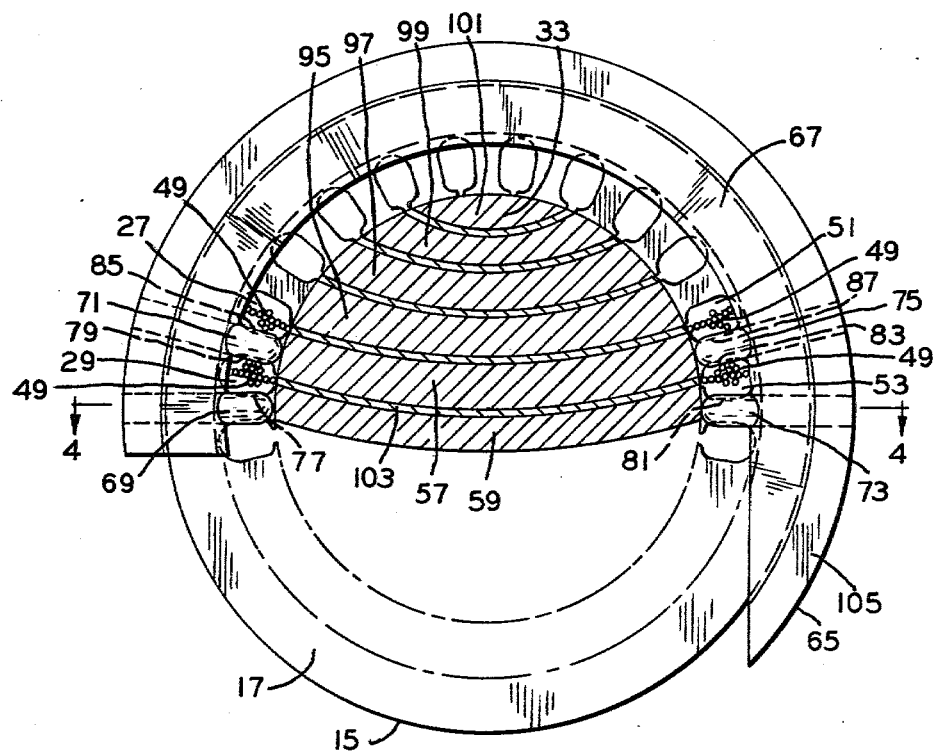
FIG. 3 is a partial end view of the coil guiding device, the stator assembly and the coil insertion mechanism, in cross-section, of FIG. 2.

Referring to FIGS. 2 and 3, the coils 35 and 37 are axially inserted or transferred into slots 27, 51 and slots 29, 53 respectively, of the magnetic core 15 by confining a portion, such as confined portion 55 (FIG. 2) of the coil 37, of the leading end turns 43 (FIG. 5) of the respective coils between cylindrical sections such as 57 and 59 of the coil transfer device 33. The confined portion of the leading end turns of each coil is moved axially through the bore of the magnetic core 15 by moving the transfer device and the magnetic core relative to each other with the transfer device moving within the bore as illustrated in FIGS. 2 and 3. As the confined portion of the leading end portions are moved through the bore, transitional segments 47 (FIG. 5) of the respective leading end turns are moved axially along their respective slot openings or entrances 61 (also see FIG. 5) communiccating with the bore of the magnetic core.

As the confined portions 55 of the leading end turns of the respective coils 35, 37 are moved through the bore by the inserting device 33, the side turns 49 and trailing end turns 45 of each of the respective coils, which are not confined, trail freely outside the transfer device. The side turns 49 of the respective coils are moved into their respective slots by way of the slot entrances communicating with the core face 17. Because they are not confined or hang freely about the inserting device, the side turns, prior to their insertion, occupy a relatively large cross-sectional area as compared to the cross-sectional area of the slots into which they are to be inserted. Further, the freely hanging side turns are not in axial alignment with their respective axially extending slots. Thus, the aligning and compaction of the side turns upon entry into their respective slots cause substantial pressures or forces to be generated. To minimize insertion forces or pressure exerted on the slot insulators 25, trailing side turns 49 of the coils 35 and 37 are guided into their respective slots by displacing each of the side turns inwardly toward the bore. The side turns are inwardly displaced by a coil guiding means, illustrated as guiding device 65 positioned about the face 17 of the magnetic core. Prior to entrance into their respective slots, the side turns move along a tapered inner peripheral surface 67 for gradually displacing or radially converging the side turn portions thereby guiding the side turns into their respective slots. Guiding of the side turns of each coil into their respective slots substantially reduces the pressure exerted on the slot liners at each of the slot entrances in that the tapered surface 67 of the coil guiding device absorbs the initial accommodating pressure buildup resulting from the squeezing of the large number of turns of each of the coils into a configuration or area so as to allow entry of the side turns into the selected slots of the core and from movement of the turns into alignment with their respective slots.

As illustrated in FIGS. 2 and 3, the side turn portions 49 of the coils 35 and 37 are also deflected circumferentially relative to the core face 17 along the tapered surface 67 prior to their entrance into their respective slots. As shown more clearly in FIG. 3, the side turns 49 of each of the coils deflect off a deflecting means, illustrated as four pins or studs 69, 71, 73 and 75. In the preferred arrangement, a deflecting means is utilized to deflect the side turns of outermost coils of a winding especially in, for example, a two pole motor because these coils typically have a much bigger diameter or comprise a greater number of turns than inner disposed coils of such a winding. As shown in FIG. 3, the side turns 49 (also see FIG. 5) of the coil 37, which are to be disposed in the slots 29 and 53, are deflected or guided into their respective slots by all four of the pins. The pins 69 and 71 deflect the side turns of the coil 37 away from sides 77 and 79 of the slot 29, and the pins 73 and 75 deflect the side turns away from sides 81 and 83 of the slot 53. The pin 71 also deflects or guides the side turns of the coil 35, which is to be disposed in the slots 27 and 51, away from side 85 of the slot 27, and the pin 75 also deflects side turns of the coil 35 away from side 87 of the slot 51.

The deflection or guiding of the side turns away from sides of the slots prior to their entrance therein further reduces the likelihood of damage to the slot insulators 25 (FIG. 2) of the respective slots in that such deflection minimizes insertion pressures being exerted on insulator side portions at the slot entrances about the core face 17. Further, the guiding of the side turns in a gradual manner along the tapered surface 67 minimizes interaction between wires of the side turns thereby minimizing the likelihood of damaging the insulation coating on the wire such as, for example, scratching the wire insulation.

As shown in FIG. 1, the apparatus 11 is provided with a means illustrated as the cradle 23, for supporting and relatively positioning the stator assembly 13 and the wire guide device 65. The stator assembly and the guide device are relatively positioned adjacent each other for receiving coils developed in the coil forming area of the apparatus generally denoted by the reference numeral 31. As mentioned previously, the coil developing portion of the apparatus is of the type illustrated in Mason U.S. Pat. No. 2,934,099 previously incorporated herein by reference and reference may be made to that patent for details of the coil developing. After being formed, the coils are transferred longitudinally or axially along the reference line 39 for transfer into selected slots of the magnetic core 15. The particular illustrated arrangement of FIGS. 1 and 2 is for fabrication of two pole motors with coils comprising a first pole of a main winding which may be, for example, five coils that are initially developed and then transferred into slots of the core. The core is then repositioned approximately 180 mechanical degrees relative to the guiding device 65 and relative to the coil developing and transfer portion 31 of the apparatus for subsequent insertion of coils of the second main winding pole. Lip or projection 89 of the cradle retains the core to prevent axial movement thereof within the cradle during the coil transfer operation. The cradle also includes a bracket 91 which relatively positions the stator assembly and the coil guide device for the coil transfer operation. The apparatus 11 is also provided with V-shaped deflecting member 93 which functions similarly to baffle member 155 of FIG. 20 in the aforementioned Mason U.S. Pat. No. 2,934,099 for deflecting trailing portions of coils as they are moved toward the stator assembly thereby preventing such coils from hanging up on the cradle.

FIGS. 2 and 3 illustrate further details of the coil transfer device 33 of the type utilized with apparatus 11 of FIG. 1. As illustrated in FIG. 3, the coil transfer or inserting device comprises a plurality of nested concentric cylindrical sections 57, 59, 95, 97, 99 and 101 which confine therebetween confined portions 55 (FIG. 2) of the leading end turns 43 (FIG. 5) of coils being inserted. The inserting device moves the confined portions axially through the bore with areas (such as area 103) between the cylindrical sections being aligned with the slot openings 61 (FIG. 5) so as to allow movement of the transitional segments 47 (FIG. 5) axially along their respective slot opening. Such movement of the transfer device through the bore causes movement of the side turns 49 of the coils into and axially along their respective slots to a position as illustrated for coil 35 in FIG. 5.

Figure 4:
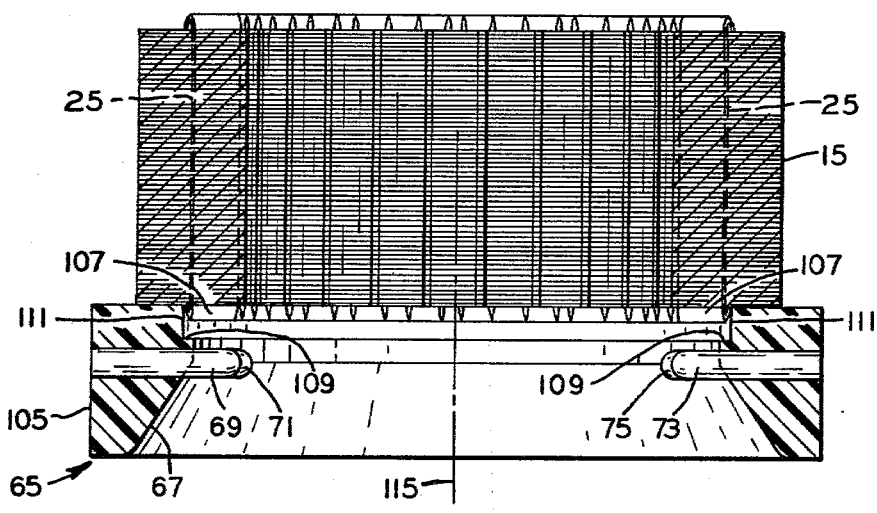
FIG. 4 is a cross-section view taken across 4—4 of FIG. 3 with the coil insertion mechanism removed.

FIGS. 3 and 4 illustrate further details of the coil guiding device 65 depicted in FIGS. 1 and 2 which provides a means of engaging and guiding side turn portions of coils being inserted into slots of the magnetic core 15. The guide device includes a guide member 105 illustrated as having a generally annular shape but being less than a complete ring for the particular application described in reference to FIGS. 1 and 2. However, for some applications, it may be desirable to configure the generally annular shaped member so as to form a completely enclosed ring. Thus, for purposes of this application, reference to a guide device having a generally annular shape is intended to refer to such a device formed in either a partial or complete ring configuration. Still further, it can readily be appreciated that the guide device could be formed in sections with such sections being positioned relative to the stator assembly to accomplish the same purpose as the illustrated guide device. The generally annular configuration allows coils to be moved therethrough with side turn portions of the coils being guided along the tapered inner peripheral surface 67, thereby displacing the side turns in a direction generally transverse to their axial direction of their movement along the slots of the core or inwardly toward the bore. The guide surface 67 decreases in diameter in the direction of coil passage; that is, the surface is tapered inwardly toward the bore of magnetic core 15. The guiding device is desirably made of a material having high wear and low friction characteristics such as, for example, nylon. Low friction characteristics are desired on the inner surface 67 to facilitate movement of the coils along the surfaces of the guide and to prevent damage such as scratching to the insulation on the wire conductors which form the coils. The guide device further includes the pins 69, 71, 73 and 75 which are positioned near the minimum diameter of the annular member and about the inner peripheral surface 67 for deflecting and thereby limiting the peripheral movement of the coils along the inner surface as previously described. The deflection pins are press fit in the illustrated guide member 105 although any suitable means may be utilized to retain the pins.

As illustrated in FIG. 4, the guide member 105 of the coil guiding device 65 includes a means for supporting and protecting cuffs 107 of the slot insulator 25 during insertion of coils. In FIG. 4, an entry edge 109 and surface 111 of the guide member form an offset which extends around an inner perimeter of the guide member for accommodating the slot insulator cuffs. The surface 111 supports the cuffs and the ledge or edge 109 protects the cuffs by diverting wires therefrom during insertion of coils into the magnetic core.

In one specific arrangement, a coil guiding device was fabricated with a configuration as shown in FIGS. 3 and 4. The device was provided with the converging or tapered inner peripheral surface 67 angled at about 35 degrees relative to a longitudinal axis 115 extending through the device. The entry edge 113 was beveled to about ⅛ inch (3.175 mm). The four deflecting pins 69, 71, 73 and 75 were formed of polished steel of about 5/32 inch (3.969 mm) diameter by ⅞ inch (22.225 mm) in length and were press fit into pin or stud receiving openings of the guide member. The generally annular portion of the device was fabricated from nylon and had approximately 3½ inch (88.9 mm) inner diameter and and 4¾ inch (120.65 mm) outer diameter and an axial length of about 1 inch (25.4 mm).

Although FIGS. 1–5 have been described in terms of the two coils 35 and 37 being inserted into the slots of the core, it is to be understood that the apparatus 11, shown in FIG. 1, would typically be transferring more than two coils into the slots of the core. For example, for a two pole motor, the apparatus illustrated in FIGS. 1–2 would form and transfer one complete pole of a main winding, which may comprise five coils, into the slots of the core. Further, a start winding, also comprising a plurality of coils, would typically, be inserted or transferred into slots of the core after the main winding has been inserted with certain coils of the start winding sharing slots with certain coils of the main winding. Still further, it can be readily appreciated that the guide device 65 could be provided with additional pins of the same type or similar to the pins 69, 71, 73 and 75 with such pins being similarly disposed relative to the core slots for deflecting or guiding additional coils being transferred into slots of the core.

Figure 6:
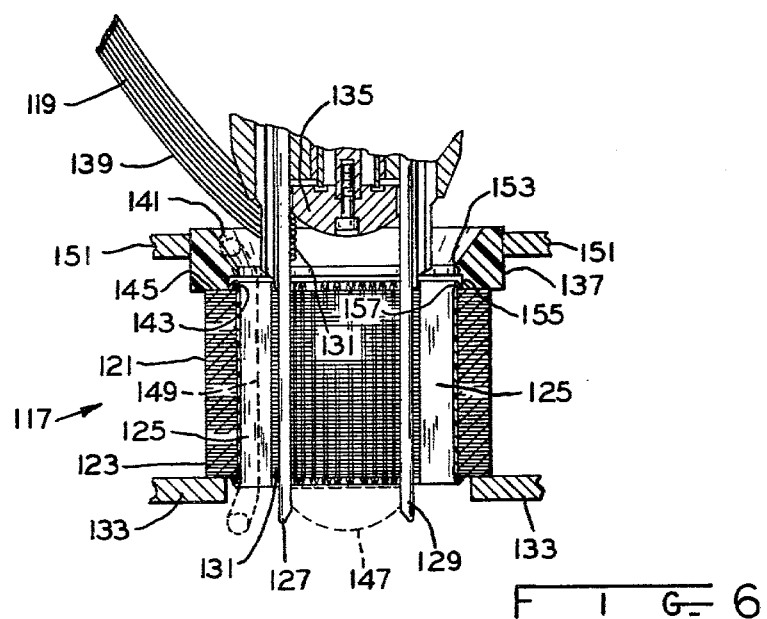
FIG. 6 is a cross-section view of another coil inserting apparatus, a coil guiding device and stator assembly.

For axial insertion of complete windings and sometimes even complete main and start windings of a motor simultaneously, machines of a type illustrated in previously incorporated Hill U.S. Pat. No. 3,324,536 may be utilized. FIG. 6 illustrates an apparatus 117 of this type with only a portion of one coil 119 being depicted although it should be readily understood that such an apparatus could simultaneous insert a complete winding or two windings substantially simultaneously with each winding comprising a plurality of coils. As shown, a stator assembly 121, including magnetic core 123 and an insulating system, illustrated as slot insulators 125 is supported on a plurality of elongated generally parallel finger elements such as finger elements 127 and 129. The finger elements interfit with slot forming teeth such as tooth 131, of the core with gaps between adjacent finger elements aligned with slot openings such as, for example, openings 61 illustrated in FIG. 5 which communicate with the bore of the stator core 123. Coils such as coil 119, which are to be inserted or transferred into the stator core, are placed over the finger elements with a portion 131 of the leading end turn of the coil being confined or lying between appropriate pairs of finger elements for insertion into the core. The core is clamped on the finger elements by two elements 133 which may be, for example, a pair of pivoting arms with the members exerting clamping forces on the magnetic core. Thereafter, a stripping device 135 is moved axially along the finger elements in close proximity thereto to slide the confined portion 131 of the coil along these finger elements and into the bore of the core.

As noted earlier, slot insulators or slot liners 125 may be damaged or dislodged during the insertion of coils into slots of the core. Therefore, in order to reduce the probability of such damage or movement of the slot insulators, a coil guiding device 137 is positioned between the stator core 123 and the coil 119 prior to the insertion of the coil into the stator core. As the stripper 135 moves the confined portion 131 axially along the bore of the core, the trailing side turn portions 139 of the coil engage the tapered surface 141 of the coil guiding device prior to entrance into the slot and are thereby converged or displaced radially inward toward the bore or in a direction substantially perpendicular to the direction of coil movement. Thus, the side turn portions are displaced so as to be generally in axial alignment with the slot prior to entrance therein.

As shown, the side turns 139 of the coil 119 hang freely on the apparatus 117 prior to their movement into the slot, and thus, the bundle of turns occupy a relatively large cross-sectional area as compared to a cross-sectional area of the slot. Further, the freely hanging side turns are not in axial alignment with the axially extending slot into which they are to be moved. Thus, the compaction and aligning of the side turns upon entry into the slot causes substantial pressures and forces to be generated. A substantial portion of these insertion forces or pressures are absorbed by the coil guiding device 137 as the side turns are moved into engagement with and along the tapered surface 141 of the device. The guiding device absorbs insertion pressure which would otherwise be exerted on the slot liner 125 at the area generally denoted by reference numeral 143; that is, the part of the slot liner lying over the slot edge or slot entrance interfacing with face 145 of the core. Forces or pressures exerted on the slot liner in the area 143 around the edges of the slot entrance would have a tendency to cause a scraping motion between the slot liner and the magnetic core causing abrasion or even severing of the slot liner.

For inserting the illustrated coil 119, the stripper 135 is moved axially through the bore of the magnetic core 123 to the position shown by dotted line 147. The side turns 139 are thereby moved axially through the core slot to the position illustrated by dotted line 149. The stripping mechanism is then retracted back through the bore from the dotted position as illustrated to the position as shown by solid lines. The clamping members 133 are then moved away from the core and the core is removed from the finger elements such as the finger elements 127 and 129.

The coil guiding device 137 for the apparatus 117 may be formed in two sections so as to form a complete ring when moved into a mating relationship. The two sections of the coil guiding device may be positioned and supported relative to each other and relative to the stator core by any suitable means such as two clamping and supporting members 151. The guide device 137 is provided with the tapered inner peripheral surface 141 to provide a guiding surface for the coil side turns 139 during insertion into the slot as previously described. The device is also provided with an entry edge 153 and surface 155 which form an offset or recessed area below the tapered surface for accommodating cuffs 157 of the slot insulators 125. The surface 155 supports the cuffs and the edge 153 protects the cuffs by diverting the coil side turns away from the cuffs during insertion of the turns into slots of the core. If additional guiding of the coils is desired, the coil guide device 137 may be provided with deflecting pins or studs such as the studs 69, 71, 73, and 75 illustrated in FIG. 3. Such pins would deflect side turns of the coils along the tapered surface and circumferentially relative to the core face 145 prior to entry of the side turns into their respective slots.

From the foregoing, it should now be readily apparent that novel wire forming methods and apparatus have been disclosed meeting the objects and advantageous features set out hereinbefore as well as others in that modifications as to the precise configurations, and shapes and details may be made by those having ordinary skill in the art without departing from the true spirit and scope of the invention as set forth by the claims which follow.

We claim:

1. A method of accommodating at least one winding comprising at least one coil formed of a plurality of conductor turns, on a stator assembly including a magnetic core having an axially extending bore, having a pair of spaced apart end faces, and having axially extending slots communicating with the end faces and the bore for accommodating the at least one winding, and also including an insulation system for providing electrical separation between the slots and the magnetic core, the method comprising: confining a portion of leading end turns of the at least one coil and axially inserting side turns of the at least one coil into respective slots of the magnetic core by moving the confined portion of the leading end turns axially through the bore of the magnetic core and by moving transitional segments of the leading end turns axially along their respective slot entrances communicating with the bore; guiding the side turns of the at least one coil into their respective slots by displacing the side turns toward the bore prior to their entry into their respective slots thereby reducing interengagement pressures between the insulation system and the magnetic core at respective slot entrances communicating with one face of the core.

2. The method of claim 1 wherein guiding the side turns of the at least one coil into their respective slots includes radially converging the side turns prior to their entry into their respective slots.

3. The method of claim 1 further including deflecting at least some of the side turns of the at least one coil circumferentially relative to a face of the core prior to their entry into their respective slots thereby further reducing interengagement pressures between the insulation system and the magnetic core.

4. The method of claim 1 wherein the insulation system includes an insulating material coating integral with at least interior walls of slots into which the side turns of the at least one coil are inserted.

5. The method of claim 1 wherein the insulation system comprises individual slot liners of insulating material disposed in slots of the core accommodating side turns of the at least one coil.

6. The method of claim 5 wherein the individual slot liners are formed of a paper insulating material.

7. The method of claim 5 wherein the individual slot liners are formed of a polyethylene terephalate insulating material.

8. A method of accommodating at least one winding comprising at least one coil formed of a plurality of conductor turns on a stator assembly including a magnetic core having an axially extending bore, a pair of spaced apart end faces and axially extending slots communicating with the end faces and the bore for accommodating the at least one winding, and an insulation system for providing electrical separation between the slots and the magnetic core, the method comprising: confining a portion of leading end turns of the at least one coil and moving the confined portion of the leading end turns axially through the bore of the magnetic core thereby moving transitional segments of the leading end turns axially along their respective slot entrances communicating with the bore and moving trailing side turn portions of the at least one coil into and axially along their respective slots of the core; and wherein the method includes transversely displacing the side turn portions in a gradual manner during axial movement of the side turn portions and prior to their entry into their respective slots thereby reducing interengagement pressures between the insulation system and the magnetic core at respective slot entrances communicating with one face of the core.

9. The method of claim 8 wherein transversely displacing the side turn portions of the at least one coil includes radially converging the side turns prior to their entry into their respective slots.

10. The method of claim 8 further including deflecting the side turns of the at least one coil circumferentially about a face of the core prior to their entry into their respective slots thereby further reducing interengagement pressures between the insulation system and the magnetic core.

11. Apparatus for transferring at least one winding comprising at least one coil formed of a plurality of conductor turns into a stator assembly including a magnetic core having an axially extending bore, a pair of spaced apart end faces and axially extending slots communicating with end faces and the bore, and an insulation system for providing electrical separation between the slots and the magnetic core, the apparatus comprising: means for supporting the magnetic core; a coil transfer device for confining a portion of leading end turns of the at least one coil and for axially inserting side turns of the at least one coil into respective axially extending slots by moving the confined portions through the axially extending bore thereby moving transitional segments of the leading end turns axially along the respective slot entrances communicating with the bore; and guiding means disposed axially relative to the magnetic core for displacing the side turns of the at least one coil inwardly toward the bore thereby reducing interengagement pressures between the insulation system and the magnetic core at respective slot entrances communicating with one face of the core.

12. The apparatus of claim 11 wherein the coil transfer device includes a plurality of concentric cylindrical segments for confining a portion of the leading side turns and moving the confined portion through the axially extending bore.

13. The apparatus of claim 11 wherein means for supporting the magnetic core includes a plurality of elongated generally parallel finger elements having gaps therebetween which are alignable with slot entrances communicating with the axially extending bore.

14. The apparatus of claim 11 wherein the guiding means includes a tapered inner surface for displacing the side turns of the at least one coil inwardly relative to the axially extending bore prior to entry of the side turns into their respective slots.

15. The apparatus of claim 11 wherein the guiding means comprises a generally annular member extending greater than 180 degrees.

16. The apparatus of claim 11 further including means for deflecting the side turns circumferentially relative to a face of the core prior to entry of the side turns into respective slots of the core, thereby further reducing interengagement pressures between the insulation system and the magnetic core.

17. The apparatus of claim 11 wherein the insulation system comprises an insulating material coating integral with at least interior walls of slots which accommodate the side turns of the at least one coil.

18. The apparatus of claim 11 wherein the insulation system comprises individual slot liners of insulating material disposed in slots of the core which accommodate side turns of the at least one coil.

19. The apparatus of claim 18 wherein the individual slot liners are formed of a paper insulating material.

20. The apparatus of claim 18 wherein the individual slot liners are formed of a polyethylene terephalate insulatig material.

21. A device for guiding coils into insulated axially extending slots of a dynamoelectric machine magnetic core having an axially extending bore, wherein the coils comprise a plurality of turns of wire conductor, the device comprising: a guide member for disposition radially outwardly from the bore so that the coils may be moved therepast for axially inserting side turns of the coils into their respective slots; the guide member having a tapered inner peripheral surface of decreasing diameter in the direction of coil passage for engaging and gradually displacing the side turn portions of the coils in a direction substantially perpendicular to the direction of coil passage thereby reducing pressure exerted on the insulating material at respective slot entrances of the side turns.

22. The device of claim 21 further comprising means for deflecting portions of the coils circumferentially about the guiding means thereby further reducing pressure exerted on the insulating material at respective slot entrances of the side turns.

23. The device of claim 21 wherein means for deflecting comprises a plurality of inwardly extending studs positioned about the inner peripheral surface of the generally annular member for limiting peripheral movement of at least some of the coils along the inner surface.

24. The device of claim 21 wherein the guide member comprises a generally annular shaped member having an angular extent in excess of 180 degrees.

25. Apparatus for transferring at least one winding comprising at least one coil formed of a plurality of conductor turns into a stator assembly including a magnetic core having an axially extending bore, a pair of spaced apart end faces and axially extending slots communicating with the end faces and the bore, and an insulation system for providing electrical separation between the slots and the magnetic core, the apparatus comprising: means for supporting the magnetic core; a coil transfer device for confining a portion of leading end turns of the at least one coil and for axially inserting side turn portions of the at least one coil into respective axially extending slots by moving the confined portions through the axially extending bore thereby moving transitional segments of the leading end turns axially along the respective slot entrances communicating with the bore; and means for engaging the side turn portions for transversely displacing the side turn portions in a gradual manner prior to their movement into their respective slots thereby reducing interengagement pressures between the insulation system and the magnetic core at respective slot entrances communicating with one face of the core.

26. The apparatus of claim 25 wherein the means for engaging includes a tapered surface for transversely displacing the side turn portions in a gradual manner prior to entry of the side turns into their respective slots.

27. The apparatus of claim 25 wherein the means for engaging comprises a generally annular member extending greater than 180 degrees.

28. The apparatus of claim 25 further including means for deflecting the side turn portions circumferentially relative a face of the core prior to their entry into respective slots of the core thereby further reducing interengagement pressures between the insulation system and the magnetic core.

* * * * *